United States Patent
Yeh et al.

(10) Patent No.: US 6,697,182 B1
(45) Date of Patent: Feb. 24, 2004

(54) OPTICAL SYSTEM OF A SCAN DEVICE

(75) Inventors: Chien-Liang Yeh, Hsin-Chu (TW); Po-Hua Fang, Yung-Ho (TW)

(73) Assignee: Veutron Corporation, Hsin-Chu (TW)

( * ) Notice: Subject to any disclaimer, the term of this patent is extended or adjusted under 35 U.S.C. 154(b) by 0 days.

(21) Appl. No.: 10/316,011

(22) Filed: Dec. 11, 2002

(51) Int. Cl.$^7$ ............................................... G02B 26/08
(52) U.S. Cl. ........................ 359/196; 355/66; 358/483
(58) Field of Search ................................ 359/196, 212, 359/850, 861, 896; 355/57, 60, 66, 67; 358/474, 493, 494, 496, 497, 483

(56) References Cited

U.S. PATENT DOCUMENTS 5,033,821 A  7/1991  Hama et al.
6,144,475 A  11/2000  Sheng
6,172,784 B1 * 1/2001  Konda ........................ 359/196

* cited by examiner

*Primary Examiner*—James Phan
(74) *Attorney, Agent, or Firm*—Rosenberg, Klein & Lee

(57) ABSTRACT

The present invention relates to an optical system, especially to an optical system which is used in a chassis of a scan device to decrease a thickness of the chassis and further to decrease a volume of the scan device. Five reflecting mirrors are assembled in the chassis and a location and an angle of each reflecting mirror is adjusted to arrange a better optical path. One of the five reflecting mirrors passes through two times reflecting processes to make light transmit from a light source to a light-receiving element successfully.

22 Claims, 1 Drawing Sheet

OPTICAL SYSTEM OF A SCAN DEVICE

BACKGROUND OF THE INVENTION

1. Field of the Invention

The present invention relates to an optical system, especially to an optical system which is used in a chassis of a scan device to decrease a thickness of the chassis and further to decrease a volume of the scan device.

2. Description of the Prior Art

An image-processing device is known which makes copies by employing a so-called electro-photographic system. In an image processing device such as an image scanner, reflected light from an original irradiation by an illuminating optical system focuses an image on a light receiving element such as a CCD (Charge Coupled Device) sensor through a reduction optical system. The optical image corresponding to the image of the original is converted into a series of electrical image signals.

On the other hand, in a color image processing device, the reflected light from the original is focused on the light receiving element through color separation filters respectively corresponding to a particular color, and then, a plurality of optical images each corresponding to these colors are converted to a series of electrical image signals.

Generally, the above color image processing device is arranged to read the image signals corresponding to three primary colors, i.e. red(R), green (G), and blue(B); and to selectively locate one of three kinds of filters in an optical path of the reflecting light from the original. An image is realized on the light-receiving element according to the located filter. An ND filter also is employed as well as three color filters for regulating an optical length and an intensity of light. Therefore, four kinds of filters are selectively inserted in the optical path.

In the scan device, light usually passes through a complex optical path to be transmitted from the light source to the light-receiving element. Therefore, how to arrange a better optical path in the scan device is an important topic. The international technologies (referring to Sheng, U.S. Pat. No. 6,144,475 or Hama, U.S. Pat. No. 5,033,821) has disclosed a lot of optical paths by using different optical systems to make light transmit from the light source to the light-receiving element and to transform original papers or figures to become image signals. But the optical paths, which is arranged by the optical systems of the traditional technologies, still needs more space to make light transmit from the light source to the light-receiving element successfully. Therefore, a thickness of the chassis is thicker to provide enough space for optical paths, which is arranged by the optical systems of the traditional technologies. This condition will cause a thickness of the chassis not to be decreased and then a volume of the scan device is also not decreased. Following above descriptions, when a volume of the scan device is needed to be smaller and smaller, the traditional optical system, which cannot decrease the thickness of the chassis and further cannot decrease the volume of the scan device, has not conformed to needs of users.

SUMMARY OF THE INVENTION

In accordance with the background of the above-mentioned invention, the traditional optical systems still need more space to make light transmit from the light source to the light-receiving element and cannot decrease the volume of the scan device successfully. The present invention provides an optical system using in the scan device to decrease a thickness of a chassis by using five reflecting mirrors, which are assembled in the chassis, and adjusting a location and an angle of each reflecting mirror to arrange a optical path, wherein one of the five reflecting mirrors passes through two times reflecting processes.

The further object of the present invention is to decrease a volume of a chassis by using five reflecting mirrors, and adjusting a location and an angle of each reflecting mirror to arrange a optical path, wherein one of the five reflecting mirrors passes through two times reflecting processes.

In accordance with the present invention, the present invention provides an optical system using in the scan device to decrease a thickness of a chassis by using five reflecting mirrors, which are assembled in the chassis, and adjusting a location and an angle of each reflecting mirror to arrange a optical path, wherein one of the five reflecting mirrors passes through two times reflecting processes. The chassis of the present invention is assembled in the chassis and a scanning plate is assembled on the chassis in the first direction of the first axis, wherein the first direction of the first axis is vertical to the scanning plate. When using the scanning device, a cover board is placed on the scanning plate in the first direction of the first axis. The light, which is shot by the chassis and passes through the scanning plate, is reflected back to the chassis by the original. The chassis comprises a light source, a light-receiving element, the first reflecting mirror, the second reflecting mirror, the third reflecting mirror, the fourth reflecting mirror, and the fifth reflecting mirror. There is the first angle between the second direction of the second axis, which is parallel to a surface of the second reflecting mirror, and the third direction of the third axis, which is parallel to a surface of the third reflecting mirror. The first angle is about 4° to 15°. There is the second angle between the second direction of the second axis and the first direction of the first axis and the second angle is about 0° to 5°. When the scan device is started to proceed with a scanning process, the first light is shot from the light source. After the first light passing through the scanning plate and reaching to the original, the first light is reflected by using the original to become the second light, which towards to the first reflecting mirror. After the first reflecting mirror receiving the second light, the second light is reflected by using the first reflecting mirror to become the third light, which towards to the second reflecting mirror. After the second reflecting mirror receiving the third light, the third light is reflected by using the second reflecting mirror to become the fourth light, which towards to the third reflecting mirror. After the third reflecting mirror receiving the fourth light, the fourth light is reflected by using the third reflecting mirror to become the fifth light, which towards to the second reflecting mirror. After the second reflecting mirror receiving the fifth light, the fifth light is reflected by using the second reflecting mirror to become the sixth light, which towards to the fourth reflecting mirror. After the fourth reflecting mirror receiving the sixth light, the sixth light is reflected by using the fourth reflecting mirror to become the seventh light, which towards to the fifth reflecting mirror. After the fifth reflecting mirror receiving the seventh light, the seventh light is reflected by using the fifth reflecting mirror to become the eighth light, which towards to the light-receiving element. In the operating process of the optical system of the present invention, the second reflecting mirror is a mirror which passes through two times reflecting processes. When the light-receiving element receiving the eighth light, the original, which are placed on the scanning plate, are transformed to become the image signals. The image signals are provided for users to proceed with following procedures. The optical system of the present invention can also decrease a thickness of the chassis and a volume of the scan device.

BRIEF DESCRIPTION OF THE DRAWINGS

In the accompanying drawing forming a material part of this description, there is shown.

DESCRIPTION OF THE PREFERRED EMBODIMENT

Figure 1:
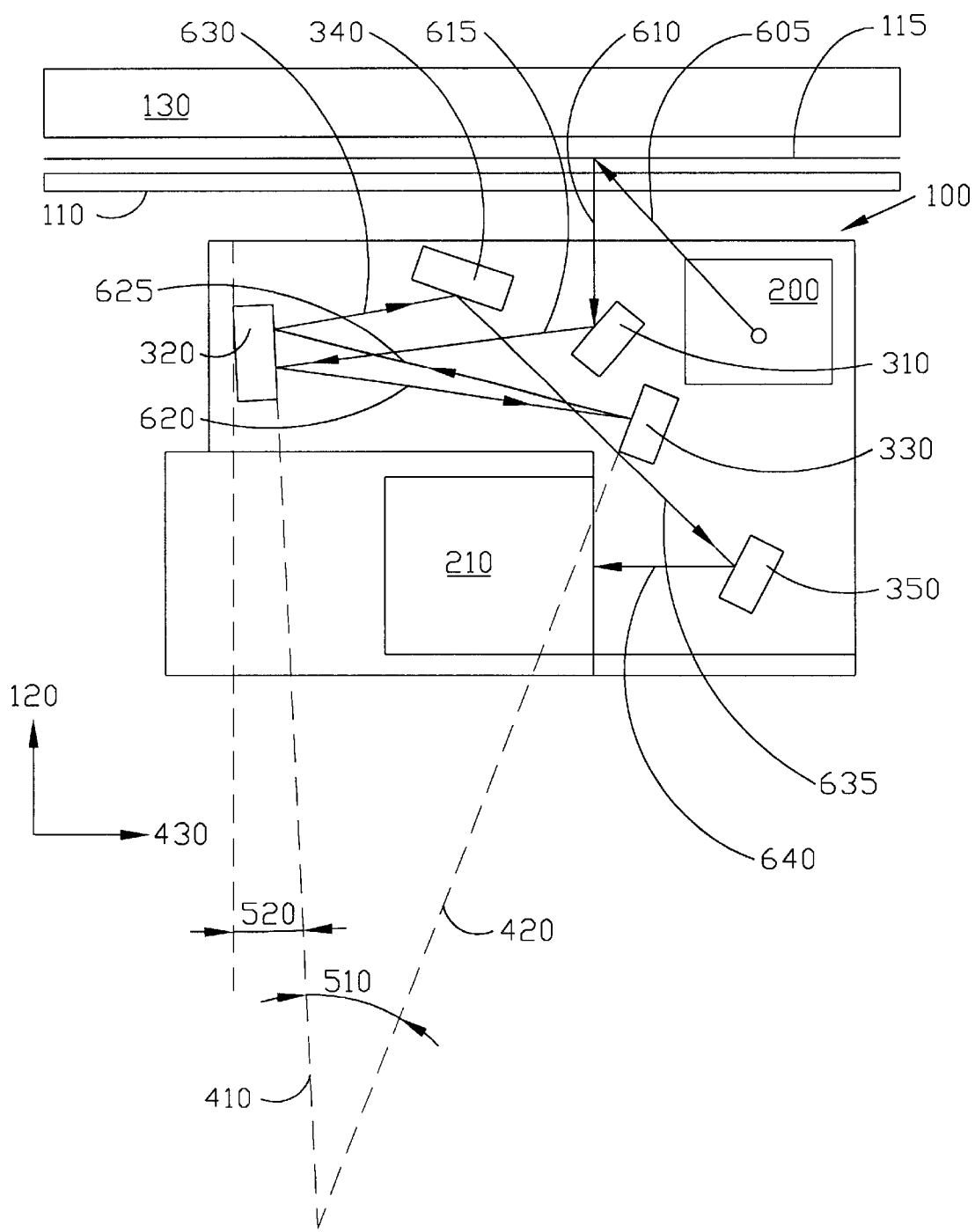
FIG. 1 is a diagram for using five reflecting mirrors to arrange an optical path of the present invention.

The foregoing aspects and many of the intended advantages of this invention will become more readily appreciated as the same becomes better understood by reference to the following detailed description, when taken in conjunction with the accompanying drawings, wherein:

The present invention provides an optical system using in the scan device to decrease a thickness of a chassis by using five reflecting mirrors, which are assembled in the chassis, and adjusting a location and an angle of each reflecting mirror to arrange a optical path, wherein one of the five reflecting mirrors passes through two times reflecting processes. Referring to FIG. 1, this shows a diagram in using five reflecting mirrors to arrange an optical path of the present invention. The chassis 100 of the present invention is assembled in the chassis and a scanning plate 110 is assembled on the chassis 100. When the scanning plate 110 is used to be a base point, location of the chassis 100 is a negative direction in the first direction of the first axis 120, wherein the first direction of the first axis 120 is vertical to the scanning plate 110. When using the scanning device, an original 115 is placed on the scanning plate 110 at first. Then a cover board 130 is placed on the scanning plate 110. The light, which is shot by the chassis 100 and passes through the scanning plate 110, is reflected back to the chassis 100 by the original 115. When the scanning plate 110 is used to be a base point, location of the cover board 130 is a positive direction in the first direction of the first axis 120.

The chassis 100 comprises a light source 200, a light-receiving element 210, such as charged coupled device, the first reflecting mirror 310, the second reflecting mirror 320, the third reflecting mirror 330, the fourth reflecting mirror 340, and the fifth reflecting mirror 350. There is the first angle 510 between the second direction of the second axis 410, which is parallel to a surface of the second reflecting mirror 320, and the third direction of the third axis 420, which is parallel to a surface of the third reflecting mirror 330. The first angle 510 is about 4° to 15°. There is the second angle 520 between the second direction of the second axis 410 and the first direction of the first axis 120. The second angle 520 is about 0° to 5°. A thickness of the chassis 100 in the first direction of the first axis 120 is less than 35 millimeters (mm). A thickness of the light-receiving element 210 is about 15 millimeters.

When the scan device is started to proceed with a scanning process, the first light 605 is shot from the light source 200. When the light source 200 is used to be a base point of the first light, the direction of the first light 605 is a positive direction in the first direction of the first axis 120 and is a negative direction in the fourth direction of the fourth axis 430, wherein the first direction of the first axis 120 is vertical to the fourth direction of the fourth axis 430. After the first light 605 passing through the scanning plate 110 and reaching to the cover board 130, the first light 605 is reflected by using the original 115 to become the second light 610, which towards to the first reflecting mirror 310. When a place of the original 115, which receives the first light, is used to be a base point of the second light 610, the direction of the second light 610 is a negative direction in the first direction of the first axis 120 and is parallel to the first direction of the first axis 120. After the first reflecting mirror 310 receiving the second light 610, the second light 610 is reflected by using the first reflecting mirror 310 to become the third light 605, which towards to the second reflecting mirror 320. When a place of the first reflecting mirror, which receives the second light, is used to be a base point of the third light 615, the direction of the third light 615 is a negative direction in the first direction of the first axis 120 and is also a negative direction in the fourth direction of the fourth axis 430.

After the second reflecting mirror 320 receiving the third light 615, the third light 615 is reflected by using the second reflecting mirror 320 to become the fourth light 620, which towards to the third reflecting mirror 330. When a place of the second reflecting mirror 320, which receives the third light 615, is used to be a base point of the fourth light 620, the direction of the fourth light 620 is a negative direction in the first direction of the first axis 120 and is a positive direction in the fourth direction of the fourth axis 430. After the third reflecting mirror 330 receiving the fourth light 620, the fourth light 620 is reflected by using the third reflecting mirror 320 to become the fifth light 625, which towards to the second reflecting mirror 320. When a place of the third reflecting mirror 330, which receives the fourth light 620, is used to be a base point of the fifth light 625, the direction of the fifth light 625 is a positive direction in the first direction of the first axis 120 and is a negative direction in the fourth direction of the fourth axis 430.

After the second reflecting mirror 320 receiving the fifth light 625, the fifth light 625 is reflected by using the second reflecting mirror 320 to become the sixth light 630, which towards to the fourth reflecting mirror 340. When a place of the second reflecting mirror 320, which receives the fifth light 625, is used to be a base point of the sixth light 630, the direction of the sixth light 630 is a positive direction in the first direction of the first axis 120 and is also a positive direction in the fourth direction of the fourth axis 430. After the fourth reflecting mirror 340 receiving the sixth light 630, the sixth light 630 is reflected by using the fourth reflecting mirror 340 to become the seventh light 635, which towards to the fifth reflecting mirror 350. When a place of the fourth reflecting mirror 340, which receives the sixth light 630, is used to be a base point of the seventh light 635, the direction of the seventh light 635 is a negative direction in the first direction of the first axis 120 and is a positive direction in the fourth direction of the fourth axis 430. After the fifth reflecting mirror 350 receiving the seventh light 635, the seventh light 635 is reflected by using the fifth reflecting mirror 350 to become the eighth light 640, which towards to the light-receiving element 210. When a place of the fifth reflecting mirror 350, which receives the seventh light 635, is used to be a base point of the eighth light 640, the direction of the eighth light 640 is parallel to the fourth direction 430 and is a negative direction in the fourth direction of the fourth axis 430.

After the light-receiving element 210 receiving the eighth light 640, the original 115, which are placed on the scanning plate 110, are transformed to become image signals. The image signals are provided for users to proceed with following procedures.

In the operating process of the optical system of the present invention, the first reflecting mirror 310, the third reflecting mirror 330, the fourth reflecting mirror, and the fifth reflecting mirror just proceed with only one reflecting process and the second reflecting mirror 320 is a mirror which passes through two times reflecting processes.

A thickness of the chassis can be reduced less than 35 millimeters in the first direction of the first axis 120 by using the optical path, which is formed by using optical system of the present invention. Therefore, the thickness of the chassis can be reduced successfully by using the optical system of the present invention. Following the thickness of the chassis being reduced, the thickness of the chassis is reduced to become thinner and thinner. At last, the volume of the scan device can be further reduced by using the optical system of the present invention.

In accordance with the present invention, the present invention provides an optical system using in the scan device to decrease a thickness of a chassis by using five reflecting mirrors, which are assembled in the chassis, and adjusting a location and an angle of each reflecting mirror to arrange a optical path, wherein one of the five reflecting mirrors passes through two times reflecting processes. The chassis of the present invention is assembled in the chassis and a scanning plate is assembled on the chassis in the first direction of the first axis, wherein the first direction of the first axis is vertical to the scanning plate. When using the scanning device, a cover board is placed on the scanning plate in the first direction of the first axis. The light, which is shot by the chassis and passes through the scanning plate, is reflected back to the chassis by the original. The chassis comprises a light source, a light-receiving element, the first reflecting mirror, the second reflecting mirror, the third reflecting mirror, the fourth reflecting mirror, and the fifth reflecting mirror. There is the first angle between the second direction of the second axis, which is parallel to a surface of the second reflecting mirror, and the third direction of the third axis, which is parallel to a surface of the third reflecting mirror. The first angle is about 4° to 15°. There is the second angle between the second direction of the second axis and the first direction of the first axis and the second angle is about 0° to 5°. When the scan device is started to proceed with a scanning process, the first light is shot from the light source. After the first light passing through the scanning plate and reaching to the original, the first light is reflected by using the original to become the second light, which towards to the first reflecting mirror. After the first reflecting mirror receiving the second light, the second light is reflected by using the first reflecting mirror to become the third light, which towards to the second reflecting mirror. After the second reflecting mirror receiving the third light, the third light is reflected by using the second reflecting mirror to become the fourth light, which towards to the third reflecting mirror. After the third reflecting mirror receiving the fourth light, the fourth light is reflected by using the third reflecting mirror to become the fifth light, which towards to the second reflecting mirror. After the second reflecting mirror receiving the fifth light, the fifth light is reflected by using the second reflecting mirror to become the sixth light, which towards to the fourth reflecting mirror. After the fourth reflecting mirror receiving the sixth light, the sixth light is reflected by using the fourth reflecting mirror to become the seventh light, which towards to the fifth reflecting mirror. After the fifth reflecting mirror receiving the seventh light, the seventh light is reflected by using the fifth reflecting mirror to become the eighth light, which towards to the light-receiving element. In the operating process of the optical system of the present invention, the second reflecting mirror is a mirror which passes through two times reflecting processes. When the light-receiving element receiving the eighth light, the original, which are placed on the scanning plate, are transformed to become the image signals. The image signals are provided for users to proceed with following procedures. The optical system of the present invention can also decrease a thickness of the chassis and a volume of the scan device.

Although specific embodiments have been illustrated and described, it will be obvious to those skilled in the art that various modifications may be made without departing from what is intended to be limited solely by the appended claims.

What is claimed is:

1. An optical system of a scan device, wherein said system comprises:
   a light source, shooting a first light;
   a cover board, receiving said first light and fixing an original for making said original receive said first light and reflect a second light;
   a first reflecting mirror, receiving said second light and reflecting a third light;
   a second reflecting mirror, receiving said third light and reflecting a fourth light, wherein there is a first angle between a first direction of a first axis which is parallel to a surface of said second reflecting mirror and a second direction of a second axis and said second direction of second axis is vertical to a scanning plate;
   a third reflecting mirror, receiving said fourth light and reflecting a fifth light to said second reflecting mirror, wherein said fifth light is reflected by said second reflecting mirror to become a sixth light after said second reflecting light receiving said fifth light and there is a second angle between a third direction of a third axis which is parallel to a surface of said third reflecting mirror and said first direction of said first axis;
   a fourth reflecting mirror, receiving said sixth light and reflecting a seventh light;
   a fifth reflecting mirror, receiving said seventh light and reflecting a eighth light; and
   a light-receiving element, receiving said eighth light.

2. The system according to claim 1, wherein said reflecting mirror passes through two times reflecting procedures.

3. The system according to claim 1, wherein said first angle is about 0° to 5°.

4. The system according to claim 1, wherein said second angle is about 4° to 15°.

5. The system according to claim 1, wherein said light source, said first reflecting mirror, said second reflecting mirror, said third reflecting mirror, said fourth reflecting mirror, said fifth reflecting mirror, and said light-receiving element are in a chassis.

6. The system according to claim 5, wherein a thickness of said chassis is less than 35 millimeters.

7. The system according to claim 1, wherein said light-receiving element is a charge coupled device.

8. A scan device, wherein said device comprises:
   a scanning plate;
   a cover board, locating on said scanning plate and a location of said cover board being a positive direction in a first direction of a first axis when a location of said scanning plate is used to be a first base point, wherein said first direction of said first axis is vertical to said scanning plate;
   a chassis, a location of said chassis being a negative direction in a first direction of a first axis when said scanning plate is used to be said first base point, wherein said chassis comprises:
- a light source, shooting a first light which passes through said scanning plate to an original, wherein said original receives said first light and reflects a second light;
- a first reflecting mirror, receiving said second light and reflecting a third light, wherein said third light passes through said scanning plate;
- a second reflecting mirror, receiving said third light and reflecting a fourth light, wherein there is a first angle between a second direction of a second axis which is parallel to a surface of said second reflecting mirror and said first direction of said first axis;
- a third reflecting mirror, receiving said fourth light and reflecting a fifth light to said second reflecting mirror, wherein said fifth light is reflected by said second reflecting mirror to become a sixth light after said second reflecting light receiving said fifth light and there is a second angle between a third direction of a third axis which is parallel to a surface of said third reflecting mirror and said second direction of said second axis;
- a fourth reflecting mirror, receiving said sixth light and reflecting a seventh light;
- a fifth reflecting mirror, receiving said seventh light and reflecting a eighth light; and
- a light-receiving element, receiving said eighth light.

9. The device according to claim 8, wherein said reflecting mirror passes through two times reflecting procedures.

10. The device according to claim 8, wherein said first angle is about 0° to 5°.

11. The device according to claim 8, wherein said second angle is about 4° to 15°.

12. The device according to claim 8, wherein a thickness of said chassis is less than 35 millimeters.

13. The device according to claim 8, wherein a direction of said first light is a positive direction in the first direction of the first axis and is a negative direction in a fourth direction of a fourth axis when said light source is used to be a second base point of said first light.

14. The device according to claim 13, wherein said fourth direction of said fourth axis is vertical to said first direction of said first axis.

15. The device according to claim 8, wherein a direction of said second light is a negative direction in the first direction of the first axis and is parallel to the first direction of the first axis when a place of said original, which receives said first light, is used to be a third base point of said second light.

16. The device according to claim 14, wherein a direction of said third light is a negative direction in said first direction of the said axis and is also a negative direction in said fourth direction of said fourth axis when a place of said first reflecting mirror, which receives said second light, is used to be a fourth base point of said third light.

17. The device according to claim 14, wherein a direction of said fourth light is a negative direction in said first direction of said first axis and is a positive direction in said fourth direction of said fourth axis when a place of said second reflecting mirror, which receives said third light, is used to be a fifth base point of said fourth light.

18. The device according to claim 14, wherein a direction of said fifth light is a positive direction in said first direction of said first axis and is a negative direction in said fourth direction of said fourth axis when a place of said third reflecting mirror, which receives said fourth light, is used to be a sixth base point of said fifth light.

19. The device according to claim 14, wherein a direction of said sixth light is a positive direction in said first direction of said first axis and is also a positive direction in said fourth direction of said fourth axis when a place of said second reflecting mirror, which receives said fifth light, is used to be a seventh base point of said sixth light.

20. The device according to claim 14, wherein a direction of said seventh light is a negative direction in said first direction of said first axis and is a positive direction in said fourth direction of said fourth axis when a place of said fourth reflecting mirror, which receives said sixth light, is used to be a eighth base point of said seventh light.

21. The device according to claim 14, wherein a direction of said eighth light is parallel to said fourth direction and is a negative direction in said fourth direction of said fourth axis when a place of said fifth reflecting mirror, which receives said seventh light, is used to be a ninth base point of said eighth light.

22. The device according to claim 8, wherein said light-receiving element is a charge coupled device.

* * * * *